March 17, 1964
L. J. BOARDMAN
3,125,625
OSCILLATING MIRROR PHOTOMETER
Filed Nov. 29, 1960
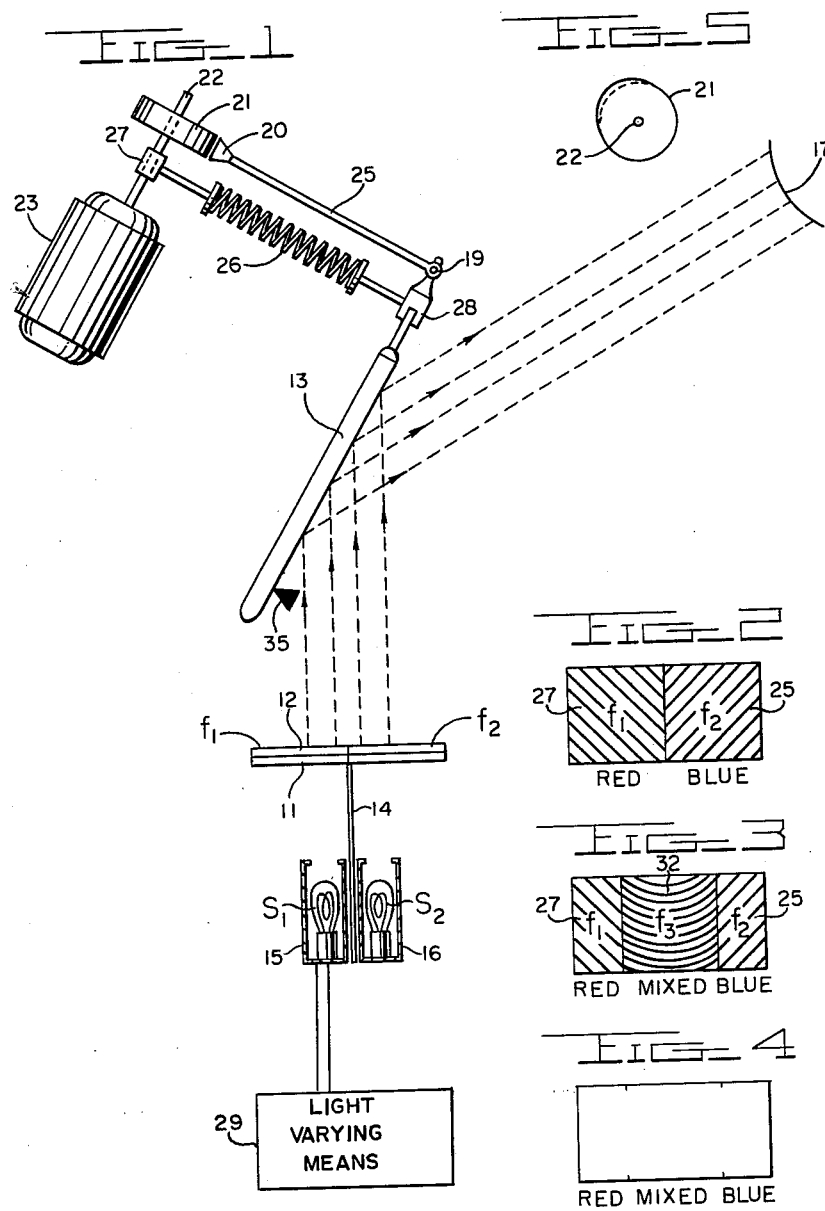
INVENTOR
LELAND J. BOARDMAN
BY
ATTORNEY

United States Patent Office 3,125,625
Patented Mar. 17, 1964

---

3,125,625
OSCILLATING MIRROR PHOTOMETER
Leland J. Boardman, 8728 Colesville Road,
Silver Spring, Md.
Filed Nov. 29, 1960, Ser. No. 72,534
3 Claims. (Cl. 88—14)
(Granted under Title 35, U.S. Code (1952), sec. 266)

The invention described herein may be manufactured and used by or for the Government of the United States of America for governmental purposes without the payment of any royalties thereon or therefor.

This invention relates to apparatus and a method for measuring the brightness of colored illuminated fields and in particular to a photometer in which an oscillating mirror is used to compare the unknown brightness of any colored field with the known brightness of a standard color.

In visual photometry, the brightness of any object or field is measured by comparing it with a standard by placing the two fields side by side. The brightness of the standard is usually variable. It is easy to make the two fields equally bright if they are the same color; however, when the colors are not the same, photometry has serious handicaps. One prior art method used to compare the colors of two fields is the usual flicker method which does not accomplish the intended task of making the colors the same. The comparison of colors depend on the speed of the flicker and for one color is higher than the other. Therefore two colors widely different cannot be compared satisfactorily with the flicker method.

The general object of the invention is to provide apparatus for measuring the brightness of colors, including that of fluorescent and phosphorescent materials where equal brightness is to be determined.

It is also an object of the invention to provide apparatus for measuring the brightness of any color by visual comparison with the known brightness of a standard color.

It is a further object of the invention to provide means for accurately measuring the brightness of colors, not only those of high intensity of brightness but also the brightness of those of low intensity.

It is an additional object of the invention to provide means by which the above objectives may be rapidly accomplished with substantial accuracy and independently of the personal factor as possible.

It is also an object of the invention to provide a method of operation by which the brightness of colors may be accurately determined.

The attainment of these objectives and of others will be apparent from the following description and from the drawings hereto attached which merely lilustrate a preferred embodiment of the apparatus of the invention and views obtained in the operation thereof.

The claims define the scope of the invention.

In these drawings:

FIGURE 1 is a diagrammatic plan, schematic in character, showing the various parts of the apparatus in operative relationship to each other.

FIGURE 2 is a view obtained by the observer in looking into the mirror showing the colored fields when the mirror is stationary.

FIGURE 3 is a view obtained by the observer in looking into the mirror when the latter is oscillated and both colors are of unequal brightness, and FIGURE 4 is a view obtained by the observer when the mirror is oscillated and the brightness of the standard color is reduced to the unknown brightness of the other color.

FIGURE 5 is a showing of the cam in relationship to the rotatable shaft.

The present invention is directed to a device which makes use of an oscillating mirror to reflect simultaneously two illuminated fields $f_1$ and $f_2$ of a known color and an unknown color to compare the color of the two fields by visual observation. Oscillation of the mirror through a small angle by a cam, mixes a portion of each field which, as viewed by the eyes, appears between the two unmixed fields. The color of the mixed field at each edge is the same as its neighboring unmixed portion so that the same color appears on each side of a dividing line. It has been determined through operation of the present device that when an illuminated field of known intensity is varied to equal the color of the unknown illuminated field, the lines separating the unmixed portions and the mixed portions disappear as viewed by the eye. Thus when the illuminated field of known intensity is varied to match that of an unknown field there will be no obvious lines separating the fields of view. The dividing line between the mixed portions and the unmixed portions disappear because the different light portions are moved to and fro by the mirror and being of the same light intensity, the color gradient is uniform making a gradual color change, all equally bright over the solid and mixed fields. Since the colors of the different fields are equally bright, the perception of the eye cannot determine any boundary lines between the apparent mixed color field and the solid color fields.

Referring now to the drawings there is shown in FIGURE 1 a diagrammatic plan view of a suitable apparatus for carrying out this invention. A colored filter 11 is adapted to be positioned adjacent to an opal glass 12 and the combination is positioned relative to and spaced from a mirror 13 positioned at approximately 45 degrees relative to the filter and opal glass. A partition 14 extends from the colored filter in a direction opposite to the mirror and separates two light or color source at 15 and 16 from each other such that the light intensity from each of the light sources will pass through any desired colored filters and opal glass combination and will be reflected by the mirror toward a viewer at 17.

The mirror is pivoted about a point at 35 and adapted to be oscillated by a cam follower 20 pivotally connected thereto at 19 by a cam 21 which is rotated by a shaft 22 of a motor 23 or any other suitable device. Cam 21 is designed with a maximum throw of 0.18 inch, the radius being uniformly increased directly as the angular displacement or a total throw of 0.18 inch for 180° rotation of the cam. From 180° to 360° rotation of the cam the radius is decreased at the same rate as that of the increase through the 0° to 180° range. This uniform increase and decrease of radius of the cam imparts an oscillatory motion of uniform linear velocity to the end of mirror 13 opposite to the pivot 35 when the speed of rotation is constant by means of cam follower 20 which is connected to arm 25 and held in contact with the cam surface by spring 26 which is under stretch between shaft bearing 27 and mirror lever arm 28. Cam follower 20 is pivotally connected to lever arm 28 at 19. The rate of rotation of cam 21 is adjustable by adjusting the speed of the motor. The cam oscillator arm 25 moves along a line and the force of the spring pulling the mirror lever arm 28 causes the mirror to oscillate over a small angle as the cam is rotated by the motor.

In operation a light source or color of known intensity such as red is positioned at 15 and provides a field of color $f_1$. The light source of known intensity can be adjusted to known values by use of any suitable light varying means 29 such that the intensity of field $f_1$ is known at all times. A light source of unknown intensity such as blue is positioned at 16 and provides a field of color intensity $f_2$. When the mirror is stationary the two different fields $f_1$ and $f_2$ will appear as two separate fields of different intensity as illustrated in FIG. 2. The motor is then operated wherein the mirror is oscillated through a small angle of uniform linear velocity by the cam and the movement of the mirror lever.

The light from the two adjacent fields incident on the mirror is reflected by the mirror, mixing a portion of each field which appears between the two unmixed field portions $f_1$ and $f_2$ as field $f_3$ as illustrated in FIG. 3. The color of the mixed field $f_3$ at each edge is the same as the neighboring unmixed fields $f_1$ and $f_2$ so that the same color appears on each side of each dividing line bounding the mixed field 32. As long as the colored fields are of unequal brightness, the boundary lines of mixed field 32 appears as definite dividing lines. Then the intensity of light source at 15 is varied and when the field $f_1$ becomes the same brightness as $f_2$, the boundary lines of mixed field 32 as viewed at 17 disappear to provide a smooth color gradient between the red and blue as illustrated in FIG. 4. Thus when the mirror is oscillated through a small angle and the brightness of the fields $f_1$ and $f_2$ are equal, the dividing lines of 32 disappear and the color of the two fields fuse by the adjacent areas shading from one into the other as illustrated in FIG. 4. Since the best results in photometry are obtained when the two fields have the same color, the instrument accomplishes this task by making the colors on both sides of each of the two dividing lines the same, and this is why the lines disappear when the brightnesses are the same. The oscillating mirror apparently forms the mixed field and places it between the two original colored fields. The task is thus performed by the small oscillations of the mirror. For best results the rate of oscillation must be variable and controlled by an operator of the equipment.

The arrangement as shown with a color filter and opal glass in between the light sources and the mirror are not necessary for all light or color sources. The opal glass is for the purpose of dispersing the light waves as they pass through the color filter obtaining any desired color. In certain cases the opal glass can be used for one, both or neither of the light sources without the filter, likewise the filter can be used or not used with either of the light sources in combination with the opal glass or without the opal glass. The use of the opal glass for dispersing the light and the color filter depends on the light source used as the reference and also the source for which the intensity is being determined.

The arrangement of the apparatus illustrated in FIGURE 1 is for the determination of the brightness of one light source relative to another in which the projected light may pass through colored filter and opal glass. The invention is not limited to such determination. The brightness of opaque colors, viz colored prints, varnishes, lacquers and glazes which are carried by opaque bodies may also be determined by this apparatus and method. This requires very little difference in the arrangement of the apparatus. The opaque colors may be mounted in front of suitable light sources at a proper angle to reflect the incident light from the color of known brightness and the color of unknown brightness onto the oscillating mirror to form the images on the mirror as two abutting fields of light. The area of the field of the unknown color may be made approximately equal to that of the known color by blocking in an area on the surface of the unknown color by means of black gummed paper, etc. The areas of the two fields should be approximately equal for best results.

Obviously many modifications and variations of the present invention are possible in the light of the above teachings. It is therefore to be understood that within the scope of the appended claims the invention may be practiced otherwise than as specifically described.

What is claimed is:

1. Apparatus for determining the brightness of colors which comprises a mirror mounted on a pivotally mounted shaft, means for securing a light source of a known variable color intensity relative to said mirror, means for securing a light source of an unknown color intensity adjacent to said light source of known variable color intensity relative to said mirror, said mirror positioned relative to said light sources adapted when at rest to reflect incident light from said sources into side-by-side abutting fields of different color intensity separated by a color division line between said fields, means for imparting oscillatory motion to said mirror with respect to said incident light sources, said oscillations of said mirror reflecting said incident light therefrom into separate fields separated by a mixed field of a portion of each light with a boundary line between each separate field and the mixed field, said color intensity on each side of said boundary lines matching with the adjacent field color, means for adjusting said variable light intensity until the color intensity of each field is equal whereby the boundary lines between each field and the mixed field disappears under visual observation.

2. Apparatus for determining the brightness of colors which comprises a motor, a driven shaft connected to said motor, a cam connected to said shaft and adapted for rotation therewith, a cam follower arm positioned adjacent said cam and adapted for linear movement as said cam is rotated, a spring adapted to hold said cam follower arm against said cam, an arm pivotally connected to said cam follower arm and movable against said spring, a mirror secured to said arm and adapted for oscillatory movement as said cam is rotated, means for securing a light source of a known variable color intensity relative to said mirror, means for securing a light source of an unknown color intensity adjacent to said light source of known variable color intensity relative to said mirror, said mirror positioned relative to said light sources adapted when at rest to reflect incident light from said light sources into adjacent side-by-side abutting fields of different color intensity separated by a color division line between said fields, said motor driven cam adapted to impart oscillatory motion to said mirror with respect to incident light, said oscillations of said mirror reflecting said incident light therefrom into separate fields of different light intensity separated by a mixed field of each light with a boundary line between each field of different light intensity and the mixed field, means for adjusting said variable light intensity until the color intensity of each field is equal whereby the boundary lines between each field and the mixed field disappears under visual observation.

3. The method of determining the brightness of an unknown color which comprises projecting a beam of light from said unknown color onto a reflecting mirror, projecting another beam of light from a color of known brightness onto said reflecting mirror, the reflection of the two beams of light appearing as two abutting fields of light separated by a color division line, oscillating said mirror whereby the line separating the said two fields of color appears to produce a third field of color lying between and over-lapping of portion of said two fields and varying the brightness of the second color a known amount until the two lines visually vanish, at which point the two colors are of equal brightness and the brightness of the first color is determined.

References Cited in the file of this patent

UNITED STATES PATENTS

| | | |
|---|---|---|
| 2,163,538 | Clothier et al. | June 20, 1939 |
| 2,262,584 | Herriott | Nov. 11, 1941 |
| 2,849,618 | Smith | Aug. 26, 1958 |
| 2,953,963 | Bulkley et al. | Sept. 27, 1960 |
| 3,057,253 | Johnson | Oct. 9, 1962 |